United States Patent
Luo et al.

(10) Patent No.: US 12,468,497 B2
(45) Date of Patent: Nov. 11, 2025

(54) BANDWIDTH MANAGEMENT METHODS AND SYSTEMS BASED ON CLIENT-SIDE ENVIRONMENT DATA

(71) Applicant: Verizon Patent and Licensing Inc., Basking Ridge, NJ (US)

(72) Inventors: Liang Luo, Nutley, NJ (US); Tom Hsi Hao Shang, Forest Hills, NY (US); Elena Dotsenko, Princeton, NJ (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 17/974,999

(22) Filed: Oct. 27, 2022

(65) Prior Publication Data
US 2024/0143263 A1 May 2, 2024

(51) Int. Cl.
| | |
|---|---|
| G06F 3/14 | (2006.01) |
| G06F 11/34 | (2006.01) |
| H04L 65/75 | (2022.01) |
| H04L 65/80 | (2022.01) |

(52) U.S. Cl.
CPC ........ G06F 3/1454 (2013.01); G06F 11/3438 (2013.01); H04L 65/762 (2022.05); H04L 65/80 (2013.01); *G09G 2340/0414* (2013.01); *G09G 2340/0421* (2013.01); *G09G 2340/0435* (2013.01); *G09G 2350/00* (2013.01)

(58) Field of Classification Search
CPC .............. H04N 21/44218; H04H 60/65; G06F 3/1454; G06F 11/3438; H04L 65/762; H04L 65/764; H04L 65/80; G09G 2340/0414; G09G 2340/0421; G09G 2340/0435; G09G 2350/00
See application file for complete search history.

(56) References Cited

U.S. PATENT DOCUMENTS

| | | | |
|---|---|---|---|
| 7,284,201 B2 * | 10/2007 | Cohen-Solal | H04L 65/752 715/863 |
| 9,253,229 B1 * | 2/2016 | Strothmann | H04N 21/23439 |
| 10,200,725 B2 * | 2/2019 | Tatourian | G09G 5/391 |
| 10,757,367 B1 * | 8/2020 | Peters | H04N 7/152 |
| 10,855,952 B1 * | 12/2020 | Rocklin | H04L 65/1089 |
| 11,336,707 B1 * | 5/2022 | Pipher | H04L 65/756 |
| 11,451,746 B1 * | 9/2022 | Graybill | G06T 7/11 |
| 11,961,410 B1 * | 4/2024 | Lin | H04N 5/2621 |

(Continued)

*Primary Examiner* — Patrick F Riegler

(57) ABSTRACT

An illustrative content server system associated with a server domain may transmit, to a client device associated with a client domain, a data stream representing media content. The media content is represented at a first quality level for presentation within a presentation environment as the data stream is transmitted. Based on environment data captured in the client domain to represent real-time conditions of the presentation environment as the media content is presented, the content server system may determine an engagement parameter representing a real-time engagement level of a user with respect to the media content. Based on this engagement parameter, the content server system may adjust, in real time during the transmitting of the data stream and presentation of the media content, the data stream to represent the media content at a second quality level that is different from the first quality level. Corresponding methods and systems are also disclosed.

19 Claims, 10 Drawing Sheets

(56) References Cited

U.S. PATENT DOCUMENTS

| | | | |
|---|---|---|---|
| 2013/0298146 A1* | 11/2013 | Conrad | H04N 21/6582 725/35 |
| 2014/0168277 A1* | 6/2014 | Ashley | G06F 3/1446 345/672 |
| 2017/0086090 A1* | 3/2017 | Sharma | H04L 65/403 |
| 2017/0251204 A1* | 8/2017 | Gupte | H04N 19/597 |
| 2017/0295404 A1* | 10/2017 | Meredith | H04N 21/252 |
| 2018/0288120 A1* | 10/2018 | Dorwin | G06F 21/105 |
| 2020/0363868 A1* | 11/2020 | Freiin von Kapri | G06F 3/013 |
| 2023/0127471 A1* | 4/2023 | Sanders | H04N 21/4436 725/12 |
| 2023/0164387 A1* | 5/2023 | Bustamante | H04N 21/23439 725/12 |
| 2023/0306782 A1* | 9/2023 | Dalabehera | G06V 40/165 382/118 |
| 2024/0121358 A1* | 4/2024 | Wang | G06T 7/20 |

* cited by examiner

BANDWIDTH MANAGEMENT METHODS AND SYSTEMS BASED ON CLIENT-SIDE ENVIRONMENT DATA

BACKGROUND INFORMATION

Data streams representing various types of media content are transmitted from server systems to client devices for a variety of applications. A video streaming application, for example, may allow a user to select movies, television shows, and other video content to watch on demand as data representing the audio/video content streams from a server associated with a video streaming service to a client device used by the user (e.g., a mobile device, a television, etc.). Other example applications may involve streaming audio content (e.g., a music streaming service, a podcast streaming service, etc.), interactive content (e.g., a video game stream, etc.), textual content (e.g., a live Tweet of an event), or the like.

Volumetric content used to provide an extended reality experience (e.g., a virtual reality experience, an augmented reality experience, etc.) is another type of media content that may be streamed in certain applications. For example, a real-time extended reality experience may be provided to a user by streaming data captured in real-time from a scene that is reconstructed to form volumetric objects in the scene to thereby allow for the scene to be experienced by the user by way of an extended reality device (e.g., a head-mounted extended reality presentation device, a mobile device, etc.). Preconstructed extended reality programs (e.g., analogous to video games or movies) may likewise be streamed to users as part of a streaming service in a similar way as other types of media content described above.

Data streams representing media content (and volumetric content in particular) may include relatively large amounts of data. As such, these data streams may put strain on devices transmitting and receiving the data streams, as well as on network components that carry and communicate the data. To address this strain and to attempt to make systems and communications efficient and low-impact (e.g., to reduce power, waste of processing capacity, etc.), streaming systems may employ bandwidth management that attempts to reduce the amount of data that is transmitted while minimizing tradeoffs to user experience, content quality, and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
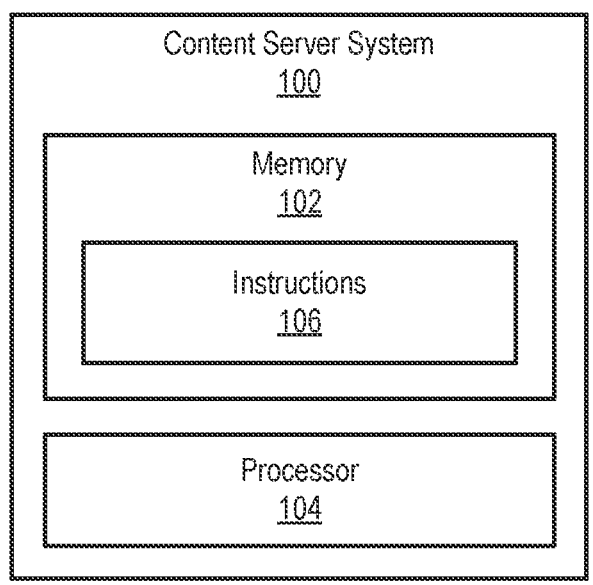
FIG. 1 shows an illustrative content server system configured to implement bandwidth management based on client-side environment data.

Bandwidth management methods and systems based on client-side environment data are described herein. As described above, it may be desirable, for a variety of data streaming applications, to perform data transmissions efficiently and with low impact while also considering effects of data transmission rates that may be in conflict with the goal of limiting data rates of such streams. For example, various aspects of the quality level of content represented by a given data stream may depend directly on how much data can be transmitted as part of the data stream. The balancing of these types of competing interests (e.g., efficiency of lower data rates on one hand and the quality of content on the other) may be referred to as herein as "bandwidth management" for a data stream.

The bandwidth of a data stream may refer to the amount of information that is communicated by way of the data stream as a function of time (e.g., a data rate for the data stream). As such, the management of this bandwidth may involve managing various aspects of a system transmitting the data stream, the content represented in the data stream, the way that the content is encoded within the data stream (e.g., including compression techniques, etc.), and/or other aspects of the data transmission to control how much data is being transmitted at any given time.

Conventional bandwidth management of streaming data has focused on what can be done by the data transmitter (e.g., a server system that provides data to a client device) or to the transmitted data itself in a relatively static way without regard for real-time conditions where the data is being received and/or used. For example, if a certain data stream (e.g., a video stream representing a movie) is requested by a client device (e.g., a television that requests the movie from a movie streaming service), a server tasked with providing the data stream may call up the proper stream (e.g., a version of the movie encoded at a suitable quality level for the requesting device) and manage bandwidth by techniques such as video compression, super-resolution, and so forth. If network conditions are such that the bandwidth of this example data stream cannot be maintained (e.g., due to network congestion, etc.), the server may decrease the quality level of the movie (e.g., transmitting a version that is encoded at a lower quality level, etc.) out of necessity and to the detriment of the viewer, who would notice the inferior quality of the movie presentation (e.g., a presentation characterized by lower resolution, a slower frame rate, a narrower color palette, lower fidelity sound, etc.).

In contrast to this conventional form of bandwidth management, bandwidth management methods and systems described herein dynamically account for client-side environment data so that bandwidth can be reduced under circumstances specifically selected so as to not result in the same detrimental effects to the user. For example, as will be described in more detail below, bandwidth reduction of a data stream may be imposed in real time when the corresponding decreases in quality that accompany the bandwidth reduction are less likely to adversely affect the user experience (e.g., since the user is positioned so as to not be able to appreciate the quality differences accompany a bandwidth change, since the user is not fully engaged with the content or actively giving the content his or her full attention, etc.). As will be described, client-side environment data may represent video data, audio data, and/or other types of data indicating behaviors of users to whom content is being presented and/or other conditions as they exist in a presentation environment where the user is located during the presentation of the content.

With the expansion of the Internet of Things (IoT), a variety of sensors that are configured to collect such environment data are ubiquitous. To provide a few examples, webcams and microphones integrated in computing devices (e.g., laptop computers, televisions, etc.), security cameras configured to monitor a room, intelligent assistant devices with integrated microphones and network connections, and so forth, may all contribute environment data that can be used as a basis for intelligent bandwidth management based on client-side environment data described herein. More examples of capture devices configured to collect and provide client-side environment data will be described below.

Various benefits and advantages may arise from bandwidth management methods and systems described herein to be based on client-side environment data. For example, all the benefits of transmitting data efficiently (e.g., less data traffic on provider networks and other networks, less data usage on users' subscription plans, less waste of processing and other computer resources, less power usage, etc.) may be provided by methods and systems described herein. However, as opposed to conventional bandwidth management techniques, these benefits may be provided without the typical tradeoffs that users would have to bear when quality of content is reduced with the bandwidth. For example, though lower quality content may be temporarily provided to a user as part of bandwidth management described herein, the quality change may not be perceived or noticed by the user due to the real-time conditions under which the user is being presented with the content. For example, the user could be paying attention to something else other than the media content such that the user is not concerned about the quality level of the content until turning their attention back to it. In other examples, the user may have left the viewing area completely or the user may be too far away from a screen on which media content is being presented to fully appreciate a certain level of image resolution, so there is no drawback to limiting the image resolution to a level that the user is capable of perceiving from their current distance.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Bandwidth management methods and systems based on client-side environment data may provide any or all of the benefits mentioned above, as well as various additional and/or alternative benefits that will be described and/or made apparent below.

FIG. 1 shows an illustrative content server system 100 ("system 100") configured to implement bandwidth management based on client-side environment data. System 100 may be implemented by computer resources such as processors, memory facilities, storage facilities, communication interfaces, and so forth. For example, system 100 may be implemented by multi-access edge compute (MEC) server systems (e.g., MEC systems operating on a provider network such as a cellular data network or other carrier network, etc.), cloud compute server systems (e.g., running containerized applications or other distributed software), on-premise server systems (e.g., configured to serve up media content to client devices at a particular site such as a business or college campus), or other suitable computing systems as may serve a particular implementation. In any of these examples, system 100 may be associated with a server domain that is distinguishable from a client domain with which a client device is associated. For example, the server domain in which system 100 operates may be communicatively coupled to the client domain in which one or more client devices operate by one or more networks or other communication components, as will be illustrated and described in more detail below.

System 100 may include memory resources configured to store instructions, as well as one or more processors communicatively coupled to the memory and configured to execute the instructions to perform functions described herein. For example, a generalized representation of system 100 is shown in FIG. 1 to include a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 (e.g., networking and communication interfaces, etc.) may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with bandwidth management based on client-side environment data in accordance with methods and systems described herein and/or as may serve a particular implementation.

Figure 2:
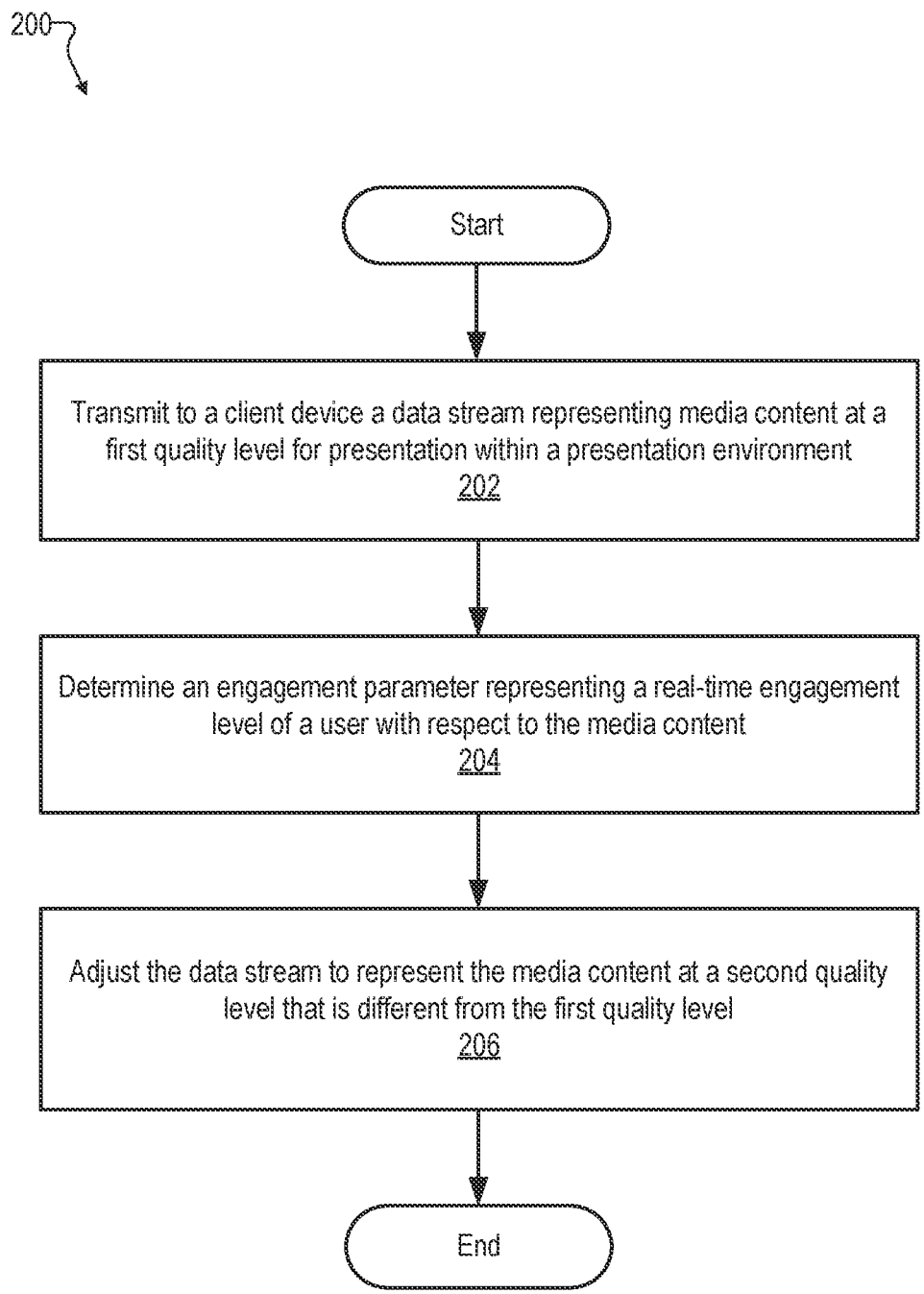
FIG. 2 shows an illustrative method for performing bandwidth management based on client-side environment data.

As one example of functionality that processor 104 may perform, FIG. 2 shows an illustrative method 200 for performing bandwidth management based on client-side environment data. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a content server system such as system 100 and/or any implementation thereof.

In certain examples, operations of method 200 may be performed in real time so as to provide, receive, process, and/or use data described herein immediately as the data is generated, updated, changed, exchanged, or otherwise becomes available (e.g., updating data streams to change their bandwidth immediately as conditions in the presentation environment are detected to change, as indicated by client-side environment data). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may transmit, from the server domain (e.g., across a network, etc.), a data stream to a client device associated with a client domain. The data stream may represent media content at a first quality level. As used herein, the quality level at which media content is represented may refer to any of various aspects defining how the media content may be perceived (in terms of quality), particularly when those aspects are at least somewhat under the control of the content server system communicating the media content. For example, one such aspect defining how media content may be perceived (and which is determined by the content server system, such as when selecting a version of the media content to include in the data stream) is the image resolution of the media content. Media content represented with a higher image resolution would typically require greater bandwidth to transmit than media content represented with a lower image resolution, but would also typically be perceived (under circumstances in which a user is paying attention and is positioned close enough to the presentation) as being of a higher quality than the content with the lower image resolution. As another example, an additional aspect determined by the content server system to define how media content may be perceived is the frame rate of the media content. Media content represented with a higher frame rate (i.e., in which frames are refreshed more often) would typically require greater bandwidth to transmit than media content represented with a lower frame rate, but would also typically be perceived (under the proper circumstances) as being of a higher quality than the content with the lower frame rate.

While these aspects of the quality level of a media content representation (i.e., image resolution and frame rate) may be focused on in the following description, it will be understood that there may be various additional aspects that define how media content is likely to be perceived, and, thus, additional aspects that may be controlled and changed to affect the quality level at which media content is represented. As a few additional examples, a quality level at which media content is represented may be at least partially defined by a video bitrate, an audio bitrate, a brightness of a video presentation, a color encoding utilized by video data, and/or any other aspects that may affect bandwidth, power usage, and/or user perception of quality. Certain aspects of quality level may be specific to a particular type of media content. For instance, image resolution may only apply to media content that includes the presentation of video or other imagery and not to media content that is limited to audio and/or text. As another example, a quality level of volumetric content (which may include representations of various volumetric objects that are all to be incorporated into an extended reality scene presented to a user) may be defined by distinct refresh rates, image resolutions, and/or other aspects for different volumetric objects. As such, one way that the quality level of volumetric content may be adjusted (e.g., to manage the bandwidth of a data stream carrying the volumetric content) is to represent only certain volumetric objects (e.g., a cropped or partial view) or to represent the different volumetric objects with differing levels of quality (e.g., based on which objects are deemed to be most important at a given time).

The data stream transmitted to the client device at operation 202 may be configured for presentation within a presentation environment as the data stream is transmitted. For example, a user may be located within the presentation environment and may be presented with the media content represented by the data stream as the data stream is received. The presentation of the media content may be by way of a presentation device that may be implemented by the client device itself (e.g., an extended reality presentation device, a mobile device, etc.) or a presentation device associated with the client device (e.g., a television screen connected to the client device, etc.).

At operation 204, system 100 may determine an engagement parameter representing a real-time engagement level of a user with respect to the media content. For example, the engagement parameter may be configured to indicate which aspects of quality the user is likely to currently perceive or care about, which aspects of quality the user may not currently perceive or care about, and the extent to which these aspects of engagement are to be accounted for at a particular moment in time. An engagement parameter may indicate, for example, that the user is currently too far away from a screen on which the media content is being presented to be able to perceive the difference between a highest image resolution available and a lower image resolution. Or, as another example, an engagement parameter may indicate that the user is distracted and not paying close attention to the presentation, such that he or she would not notice if the refresh rate of the content were reduced. Other examples of engagement parameters and what they may indicate will be described in more detail below.

The determining of the engagement parameter at operation 204 may be performed based on environment data captured in the client domain. For example, sensors such as cameras, microphones, and so forth that are integrated with the client device, the presentation device, or other devices present in the presentation environment where the user is experiencing the media content may capture and provide environment data that is used to determine the engagement parameter. As such, the environment data may represent real-time conditions of the presentation environment as the media content is presented. For example, audio and/or video data included in the environment data, when analyzed in ways described below, may reveal pertinent information such as mentioned in the examples above (e.g., how far away from the screen the user is positioned, how much attention the user is paying to the media content presentation, etc.). Additionally, other types of environment data may also be captured and analyzed to further indicate real-time conditions related to what is happening in the presentation environment. These other types of data may include actual interactions that the user is having with certain types of media content (e.g., behaviors of the user within an extended reality world or video game), user input to a game controller or other input device, and so forth.

At operation 206, system 100 may adjust the data stream being transmitted to represent the media content at a second quality level that is different from the first quality level. For example, if the first quality level used at operation 202 is a default quality level that is relatively low and the engagement parameter determined at operation 204 (on which this adjusting of the data stream is based) indicates that the user is detected to be engaging with the media content being presented (e.g., a face is detected in the room, a voice is heard indicating that the user is present, etc.), then the second quality level at which the media content is presented subsequent to the adjusting of the data stream at operation 206 may be higher than the default quality level. Conversely, if a default level is relatively high and the engagement parameter indicates that the user is absent or otherwise unengaged with the content, then the second quality level may be lower than the default quality level (e.g., the refresh rate or image resolution may be reduced to decrease the bandwidth usage for as long as the user is not fully engaged with the content).

The adjusting of the data stream at operation 206 may be performed based on the engagement parameter determined at operation 204 and may be accomplished in real time as the transmitting of the data stream is performed and the media content is presented. In this way, the quality adjustments may be very dynamic and responsive to user behaviors and other real-time conditions in the presentation environment. For example, if the user turns partially away from the screen for 30 seconds to have a conversation with someone else in the room, the real-time engagement parameter may be set responsively enough that the quality level of the media content may be downgraded to a lower quality for just those 30 seconds when high quality is not being fully appreciated, and may instantly snap back to the higher quality when the user turns back to the screen. While this example refers to binary "higher" and "lower" quality levels for simplicity, it will be understood that a wide spectrum of different quality levels (as well as different spectrums of associated with different aspects of quality) may be implemented in certain applications, such that quality may be adjusted in a gradual or step-wise manner as deemed appropriate based on various information that may be reflected in a simple or more complex implementation of the engagement parameter.

Figure 3A:
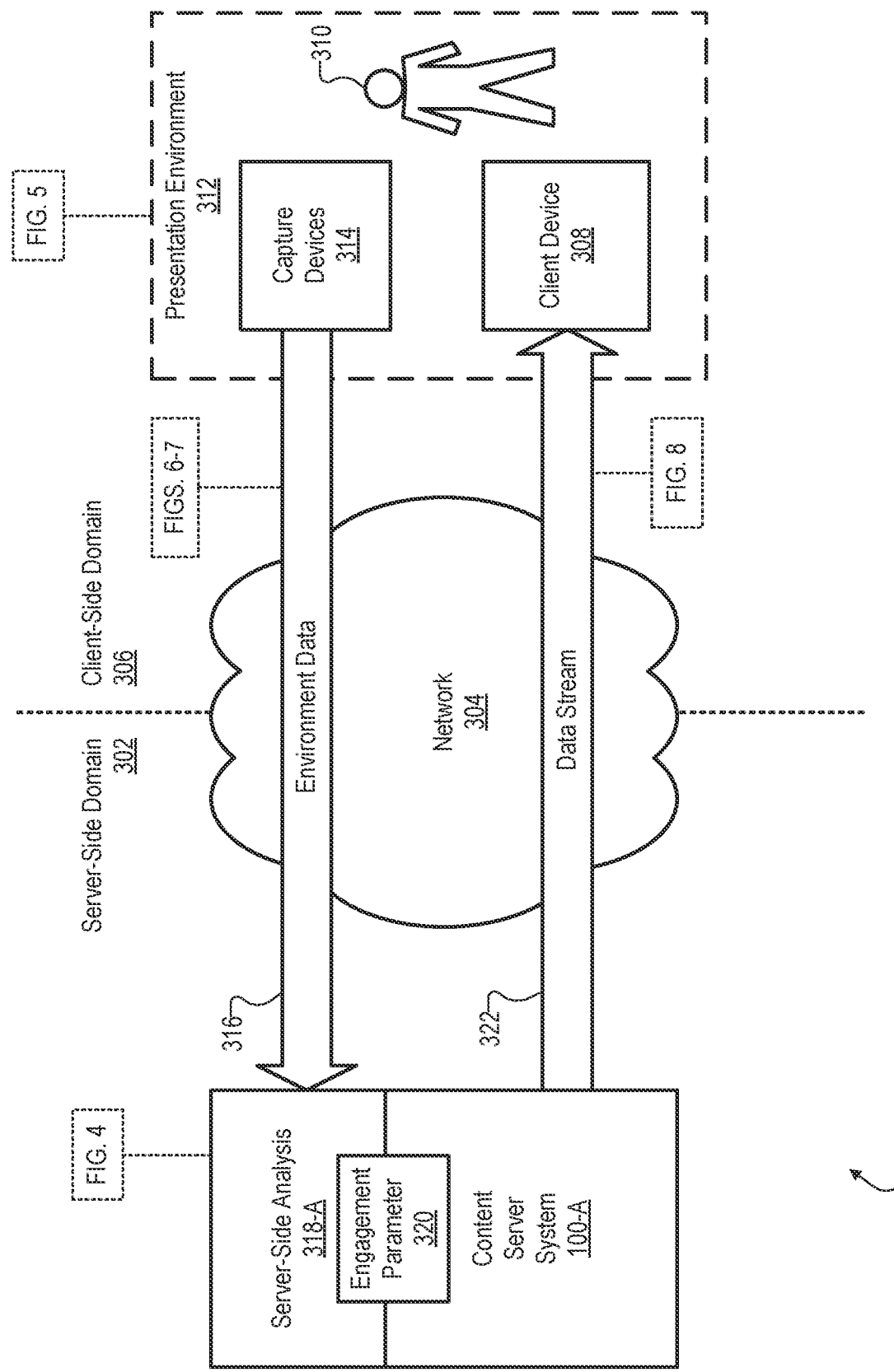
FIGS. 3A and 3B show different illustrative configurations in which the content server system of FIG. 1 may operate to implement bandwidth management based on client-side environment data.
Figure 3B:
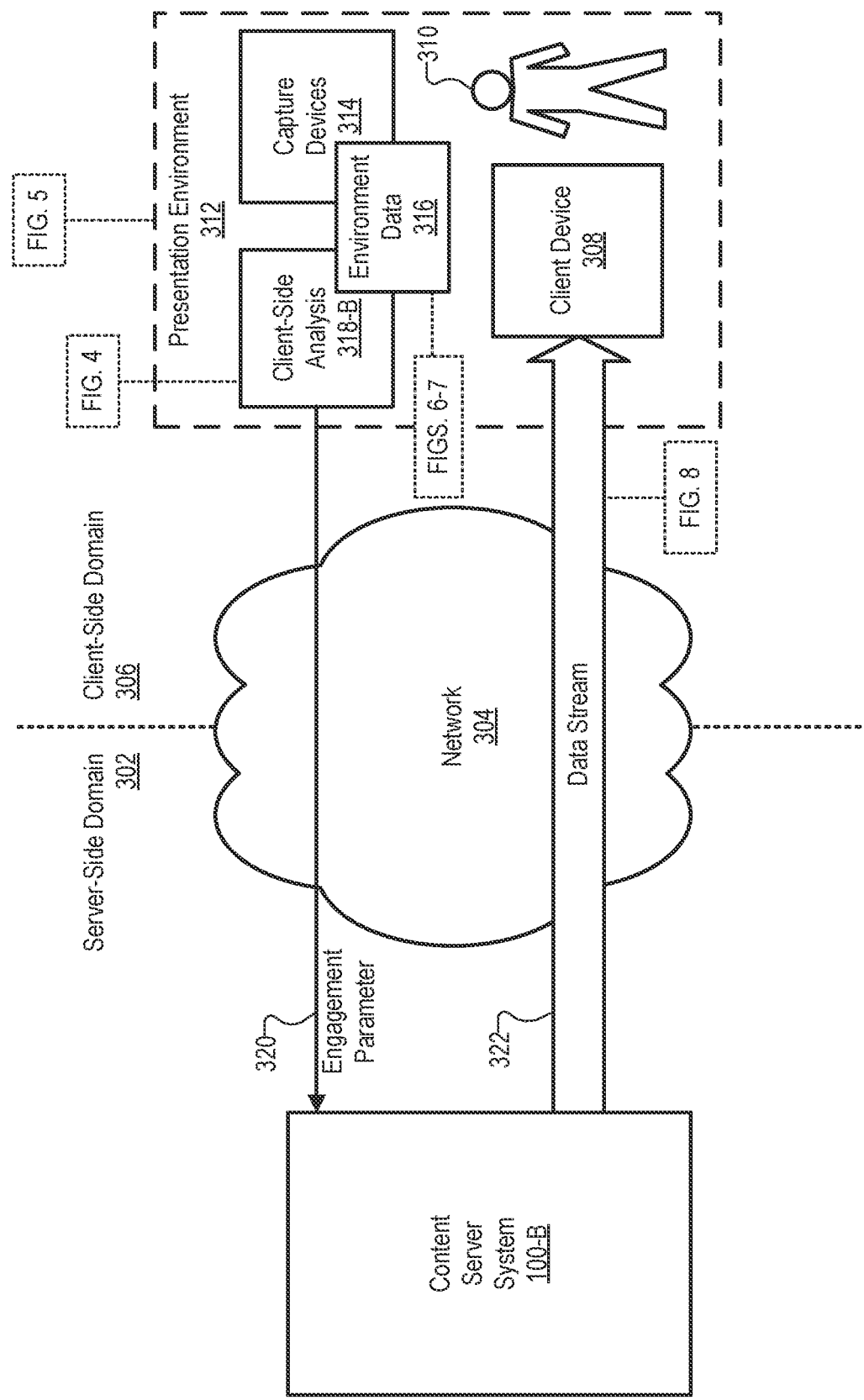

FIGS. 3A and 3B show different illustrative configurations in which system 100 may operate to implement bandwidth management based on client-side environment data. As will be described, FIGS. 3A and 3B include many of the same elements operating in the same or similar ways, but are distinguishable in that FIG. 3A shows a configuration 300-A in which environment data collected in the client-side domain is provided for analysis in the server-side domain, while FIG. 3B shows a configuration 300-B in which the analysis of the environment data is accomplished in the client-side domain such that system 100 may determine an engagement parameter by receiving the engagement parameter (rather than needing to generate it based on an analysis of the environment data).

In both of these configurations 300-A and 300-B, respective implementations of system 100 (labeled as content server system 100-A in FIG. 3A and as content server system 100-B in FIG. 3B) are shown to operate within a server-side domain 302 that is separated, by a network 304, from a client-side domain 306 in which a client device 308 operates. As shown, client device 308 may be associated with (e.g., used by) a user 310 that is present with client device 308 in a presentation environment 312 in client-side domain 306. One or more capture devices 314 may also be present with client device 308 and user 310 in presentation environment 312. As mentioned above, for configuration 300-A in FIG. 3A, capture devices 314 are shown to transmit environment data 316 back to the server-side domain 302 for a server-side analysis 318-A (e.g., performed by system 100-A or an associated computing system). Server-side analysis 318-A may determine an engagement parameter 320 that is shown to be used by the implementation of system 100 (i.e., system 100-A) in any of the ways described herein. In contrast, for configuration 300-B in FIG. 3B, capture devices 314 are shown to provide the environment data 316 for a client-side analysis 318-B within the client-side domain 306 (e.g., performed by client device 308, capture devices 314, or another associated computing system), such that it is the engagement parameter 320 that is transmitted over network 304 from client-side domain 306 to server-side domain 302 for use by the implementation of system 100 (i.e., system 100-B). In both configurations, a data stream 322 whose bandwidth is managed based on the engagement parameter 320 is provided by the respective implementations of system 100 to client device 308 over network 304.

Figure 5:
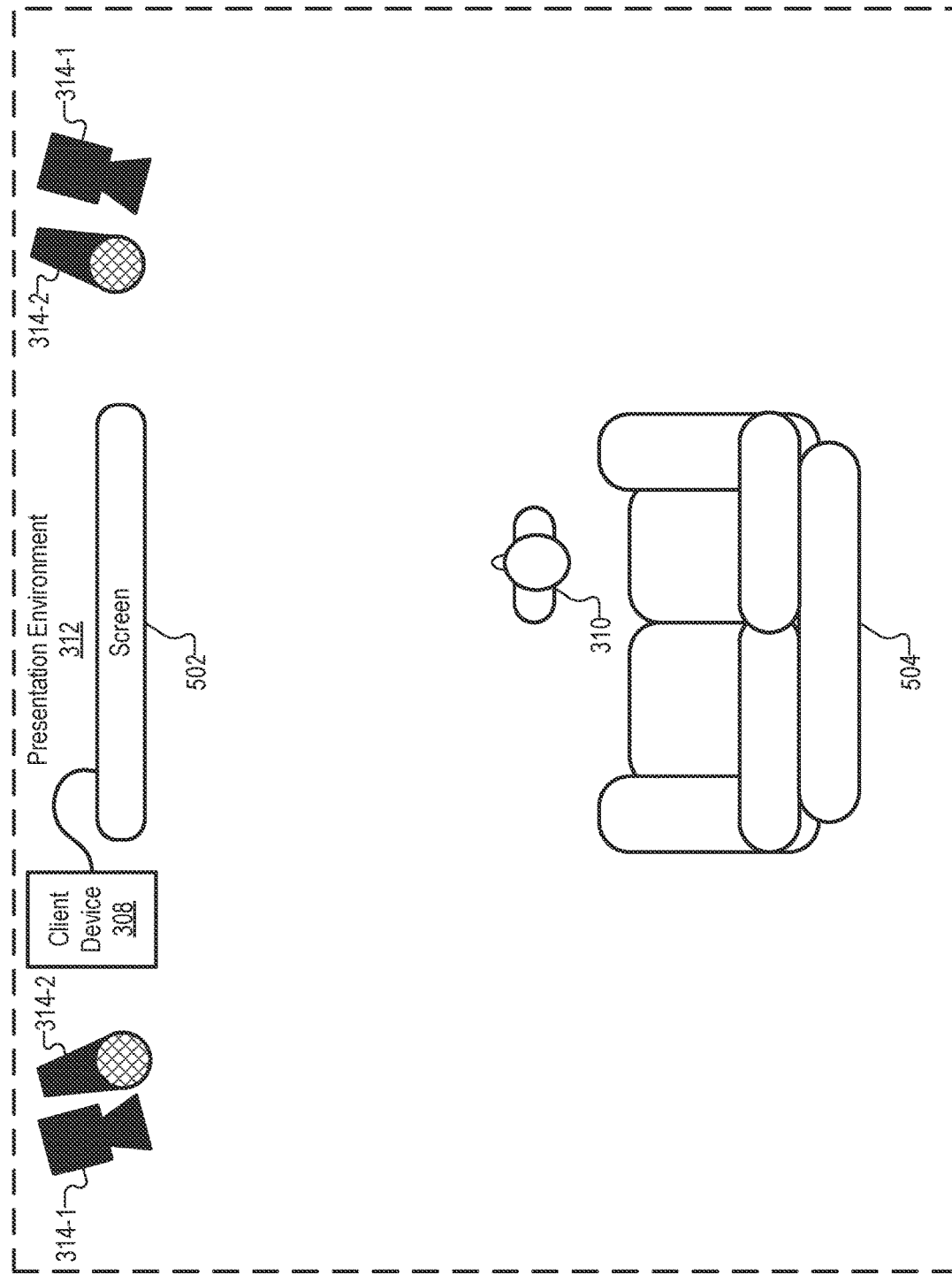
FIG. 5 shows an illustrative presentation environment in which an example user is presented with media content transmitted to a client device of the user by a content server system.
Figure 6:
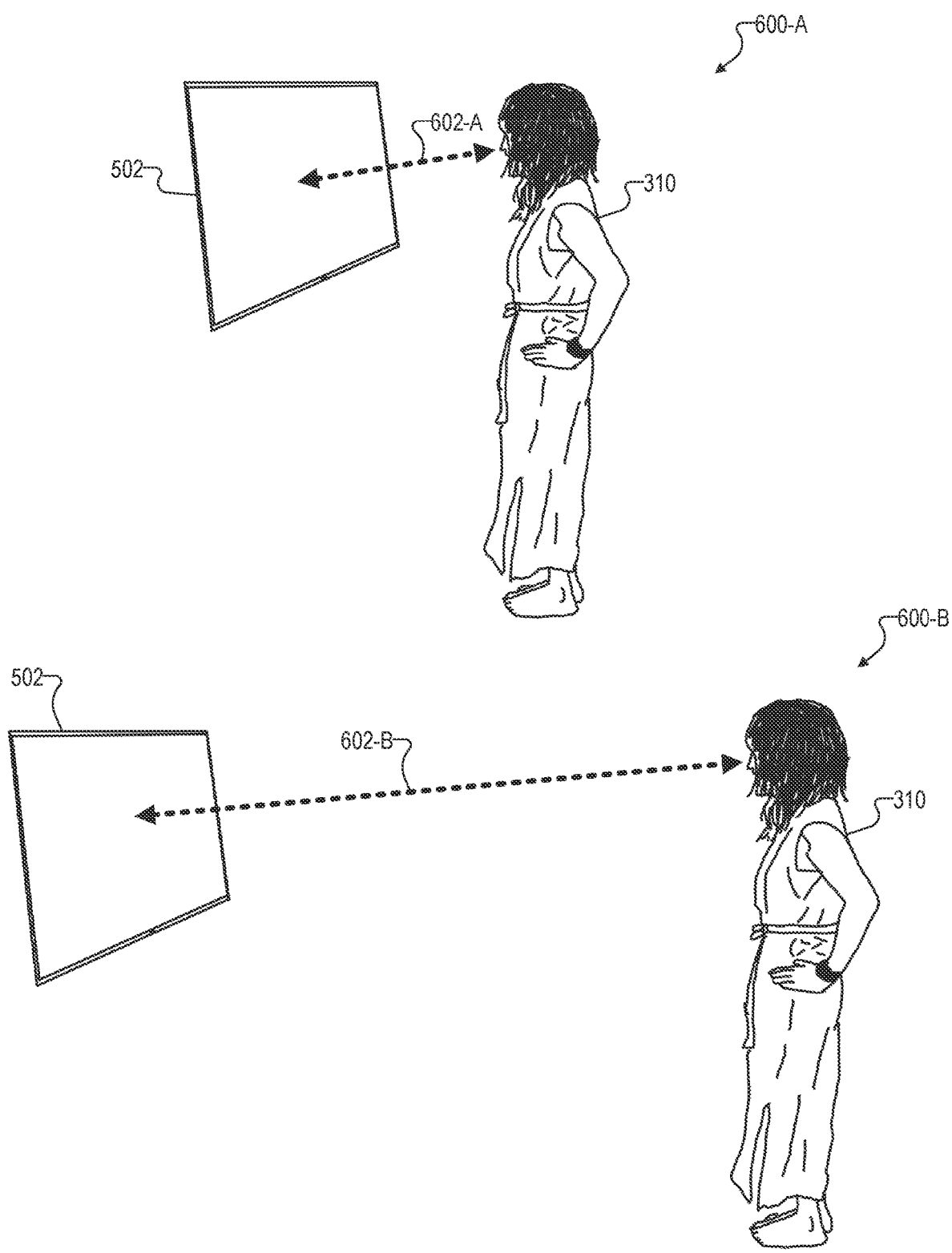
FIG. 6 shows different illustrative positions of a user with respect to a screen on which media content is being presented within a presentation environment.
Figure 7:
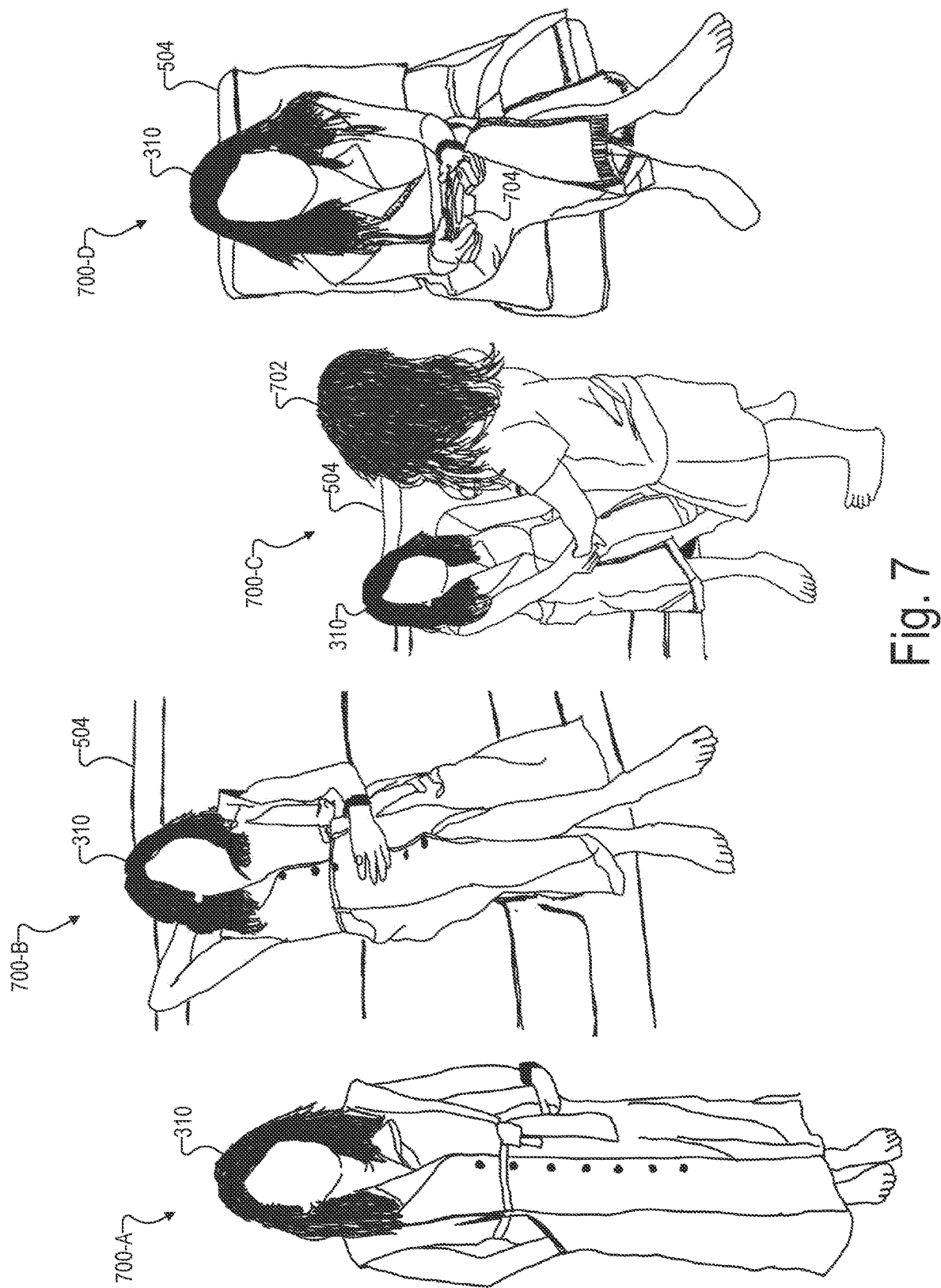
FIG. 7 shows different illustrative postures of a user within a presentation environment while media content is being presented.

Each of the elements of configurations 300-A and 300-B will now be described in more detail. As indicated by tags with dotted outlines in FIGS. 3A and 3B, FIG. 4 will be referenced to describe certain aspects of an engagement analysis 318 (i.e., the server-side analysis 318-A of FIG. 3A and the client-side analysis 318-B of FIG. 3B); FIG. 5 will be referenced to describe certain aspects of presentation environment 312; FIGS. 6-7 will be referenced to describe certain aspects of environment data 316; and FIG. 8 will be referenced to describe certain aspects of data stream 322.

Both configuration 300-A and configuration 300-B show server-side domain 302 and client-side domain 306 separated by network 304, which as shown, serves as a data delivery medium by way of which data may move between the domains. Server-side domain 302 includes computing resources that generate and provide data streams representing media content. For instance, server-side domain 302 may include compute servers deployed at cloud computing data centers, at businesses or other entities that provide media content services, at a provider network incorporated in network 304 (e.g., MEC servers, etc.), at the same site as the clients being served, or at other suitable locations. In contrast, client-side domain 306 includes computing resources that receive data streams representing the media content and present the media content to users. For instance, client-side domain 306 may include computing devices in homes or businesses that are used by end users. Network 304 may serve as a medium by way of which data is exchanged between domains 302 and 306. For example, network 304 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation.

Both implementations of system 100 shown in FIGS. 3A and 3B (i.e., systems 100-A and 100-B, respectively) may be configured to perform the operations described above in relation to method 200, as well as various other operations described herein. Specifically, for example, systems 100-A and 100-B may each be configured to transmit data stream 322 to client device 308 at a first quality level, determine engagement parameter 320 in real time based on environment data 316, and adjust the quality level at which data stream 322 represents the media content (e.g., to a second quality level that is different from the first quality level) based on engagement parameter 320. As mentioned above, however, one difference between system 100-A and 100-B relates to how each of these implementations of the content server system performs the determination of engagement parameter 320.

As shown in configuration 300-A, system 100-A may determine engagement parameter 320 by generating engagement parameter 320 based on environment data 316 received from capture device 314 in the client-side domain 306. More particularly, system 100-A may determine engagement parameter 320 by 1) receiving environment data 316 from one or more capture devices 314 operating in client-side domain 306 (e.g., devices that, as described in more detail below, are configured to capture and provide environment data 316); and 2) generating engagement parameter 320 based on server-side analysis 318-A of the received environment data 316. In contrast, as shown in configuration 300-B, system 100-B may determine engagement parameter 320 by receiving engagement parameter 320 from a device (e.g., client device 308, one or more of capture devices 314, another suitable device operating in client-side domain 306, etc.) that operates in client-side domain 306 and is configured to generate and provide engagement parameter 320 based on client-side analysis 318-B of environment data 316.

Various considerations may be accounted for in determining whether to implement system 100 to rely on server-side analysis 318-A (in the manner illustrated in FIG. 3A) or to rely on client-side analysis 318-B. For example, since an objective of system 100 is to reduce the bandwidth of data being transmitted over network 304, it may be advantageous to perform the client-side analysis as shown in FIG. 3B and provide the precomputed engagement parameter 320 to the content server system in the server-side domain (since the engagement parameter 320 may be represented by significantly less data than the raw environment data 316). On the other hand, since engagement analysis 318 may be relatively resource intensive (as described in more detail below), there may also be advantages to utilizing the relatively plentiful computing resources that may be available in the server-side domain (e.g., resources associated with powerful cloud servers, etc.) to perform the engagement analysis rather than burdening the more modest resources that may be available in the client-side domain (e.g., resources associated with consumer devices such as televisions and smart phones, etc.). Additionally, it will be understood that, while environment data 316 may comprise audio and video data similar in format to data stream 322 in certain examples, the quality and bandwidth of environment data 316 may be far less than desired for data stream 322, since environment data 316 may function suitably even with a quality level that would be undesirable for data stream 322 (e.g., a frame rate as slow as one frame per second or slower, relatively low resolution of video and audio, etc.).

In either type of implementation (i.e., that of configuration 300-A or configuration 300-B), the engagement analysis 318 (i.e., server-side analysis 318-A or client-side analysis 318-B, depending on which type of configuration is implemented) may be performed in any suitable way to analyze environment data 316 to generate engagement parameter 320 based on the environment data. For example, the determining of engagement parameter 320 may include: 1) managing (e.g., based on environment data 316), a machine learning model configured to identify a correlation between the real-time conditions represented by environment data 316 and a quality level for the media content that is likely to be discerned by the user; and 2) generating engagement parameter 320 based on environment data 316 and using the machine learning model.

Figure 4:
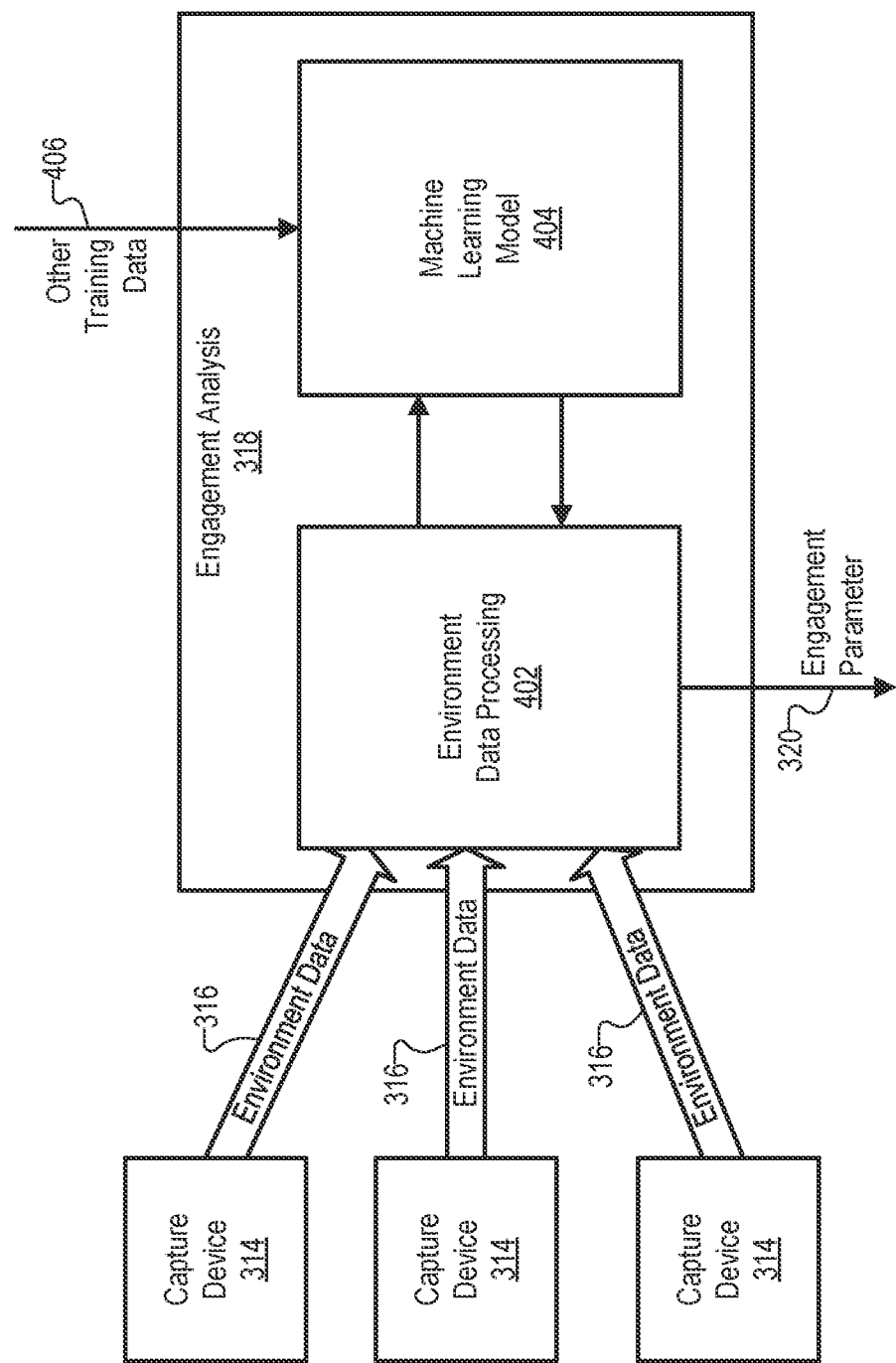
FIG. 4 shows illustrative aspects of how engagement analysis of client-side environment data may be performed to generate an engagement parameter used for managing bandwidth in accordance with principles described herein.

To illustrate, FIG. 4 shows illustrative aspects of how engagement analysis 318 (i.e., either server-side analysis 318-A or client-side analysis 318-B) of client-side environment data 316 may be performed to generate the engagement parameter 320 used for managing bandwidth in the ways described herein. As shown, engagement analysis 318 receives environment data 316 from several capture devices 314 that will be described in more detail below. Environment data processing 402 may be performed as part of engagement analysis 318 to generate engagement parameter 320 based on this environment data 316, as shown. Additionally, as further illustrated in FIG. 4, environment data processing 402 may use a machine learning model 404 that is also maintained as part of engagement analysis 318. Machine learning model 404 may be communicatively coupled to environment data processing 402 and may not only account for environment data 316 and/or other data received from environment data processing 402, but may also account for other training data 406. These aspects of the engagement analysis 318 may be similar regardless of whether engagement analysis 318 is implemented in the server-side domain 302 or the client-side domain 306.

Environment data processing 402 may include any analysis or processing of environment data 316 to determine real-time conditions of the presentation environment as the media content is being presented to any users who may be present within the presentation environment. For example, environment data 316 representing real-time video content captured in the environment may depict one or more users within the presentation environment, and processing 402 may involve determining real-time conditions related to the users such as the posture and position of each user (e.g., whether the users are facing a screen or looking away, whether the users are close enough to the screen to appreciate fine details, whether the users are moving in the environment in a manner corresponding to an extended reality experience provided by the media content, etc.), facial expressions made by each user, and so forth. As another example, environment data 316 representing real-time audio content captured in the environment may include speech or other sound made by one or more users within the presentation environment, and processing 402 may involve determining real-time conditions related to the users such as whether speech being spoken by each user is related to media content being presented (e.g., talking to other users playing a game or engaging in a shared extended reality experience) or is unrelated to the media content (e.g., talking to someone else in the environment about other matters).

In still other examples, environment data 316 may indicate other conditions of the presentation environment, including what type of presentation device is being used to present the media content (e.g., a television screen, a handheld mobile device, a head-mounted extended reality presentation device, etc.), certain properties of the presentation device (e.g., a size of the screen on which media content is being presented, a location of the screen within the environment, whether audio associated with the content is presented over personal speakers such as headphones or over a speaker system that can be heard throughout the environment, etc.), a geometric layout of the environment (e.g., whether there is seating such as sofas and chairs that are facing the presentation device, where that seating is located with respect to the presentation device, etc.), and so forth. These types of environment data 316 may likewise by processed and analyzed by environment data processing 402 to help determine relevant conditions in the environment that may help provide clues about the extent to which users in the environment are engaged with the media content being presented and able to appreciate more data-intensive quality levels of the content.

Machine learning model 404 may be used by environment data processing 402 to assess the engagement of particular users with the media content by analyzing and maintaining historical patterns of behaviors and conditions that have previously been used to successfully assess the users' engagement. A variety of body, pose, and voice detection algorithms may be implemented by machine learning model 404 for this purpose to maintain and update the machine learning model as environment data 316 is accumulated over time. As such, machine learning model 404 may help establish patterns and identify correlations between real-time conditions represented by incoming environment data 316 and quality levels for the media content that have previously been discerned (and are therefore likely to again be discerned) by particular users. For example, machine learning model 404 may determine that one particular user tends to be silent and contemplative when fully engaged with a particular type of media content (e.g., a particular video game) while determining that another user tends to be more talkative and prone to verbal outbursts while similarly engaged. As another example, machine learning model 404 may determine that one user prefers to stand near the television screen when engaging with a particular type of media content while determining that another user is unlikely to be engaging significantly with the content if he or she is standing.

Certain patterns and correlations between real-time conditions and content engagement established by machine learning model 404 may be specific to particular users, such as in the examples given above. Other patterns and correlations, however, may be determined to be more universal between users. For instance, for a particular type of media content such as a movie, machine learning model 404 may determine that all or nearly all users that are engaged in this content will sit silently in seating that faces a television screen. Machine learning model 404 may thus come to identify any user that is standing or talking as being unlikely to be fully engaged with this content, and may make this assumption as a default when a new and unrecognized user is encountered. Accordingly, global correlations and rules may help engagement analysis 318 learn quickly and efficiently, while it will be understood that correlations and rules customized and tailored to individual users may also be in play to ensure that engagement analysis 318 operates effectively for each user.

Along with real-time environment data (environment data 316) that is incoming, historical environment data (that has been stored from previous instances), and/or decisions or correlations that have been made based on this data (provided by environment data processing 402), FIG. 4 shows that machine learning model 404 may also account for other training data 406 that may assist with the pattern identification and overall learning process of the model. Other training data 406 may, for example, include feedback data that helps indicate when a decision made by engagement analysis 318 (e.g., an engagement parameter 320 that has previously been generated) has been effective or ineffective in its objective. For example, other training data 406 may indicate that a user has repeatedly paused and restarted an instance of media content shortly after a particular engagement parameter 320 was generated that caused the quality level of the media content to be reduced. This may indicate that the user perceived the reduction in quality level and was attempting to address it (by pausing and unpausing the content, restarting the stream, etc.), which may be taken into account by machine learning model 404 in the future, since it may be undesirable for the user to perceive and need to worry about quality reduction in this manner. Other training data 406 may also track conditions like whether a user has to turn up the volume, adjust settings, move closer to the screen (e.g., to see better), or the like. In some implementations, system 100 may be configured to periodically survey users about the quality they perceive (e.g., a one-question survey asking if the screen looks blurry, an occasional request to rate the quality with 1 to 5 stars, etc.), and survey results may be provided as other training data 406 to be accounted for by machine learning model 404 as future engagement parameter generation is performed.

FIG. 5 shows an overhead view of an example of a presentation environment 312 in which an example user 310 is presented with media content. For example, as described above, the media content may be transmitted to a client device 308 of user 310 by a content server system that is located elsewhere (e.g., in server-side domain 302, which is not shown in FIG. 5) and is communicatively coupled to client device 308 (e.g., by way of network 304, as described above). In FIG. 5, client device 308 is shown to be connected to a screen 502, which may represent a television screen or another suitable presentation device used to present the media content transmitted to client device 308. In some examples, client device 308 itself may incorporate the screen on which the media content is presented. For instance, client device 308 may be implemented as a laptop computer, a mobile device (e.g., smartphone, tablet, etc.), an extended reality device (e.g., a head-mounted augmented or virtual reality viewer), or another such device used by user 310 to experience the media content. In the example illustrated in FIG. 5, client device 308 may be implemented as one of these types of devices or another computing device (e.g., a set top box, a headless server, a desktop computer, etc.) that presents media content by way of screen 502, which may be large enough to be comfortably viewed by multiple people in the room and to be viewed at somewhat of a distance by user 310 (as shown).

Also illustrated within presentation environment 312 in the example of FIG. 5 is a piece of furniture 504, which may be implemented as a sofa or other type of seating that is placed in the environment for use by people watching screen 502. While user 310 is illustrated to be standing next to furniture 504 at the moment depicted in FIG. 5, it will be understood that user 310 may choose to sit on furniture 504 while engaging with certain types of media content (e.g., watching a movie or television show, etc.), and the choice by user 310 of whether to sit on the sofa or stand (as shown) may be relevant to the engagement analysis 318 described above.

While only one user 310 is illustrated in the example of FIG. 5, it will be understood that a plurality of users may be present and in various levels of engagement with the media content in certain examples. In such circumstances, engagement analysis 318 may be configured to analyze the engagement of all of the users and generate engagement parameters that cause the media content to be transmitted and presented at a quality level that is suitable for all of the users (e.g., based on whichever user is most engaged and most capable of perceiving and appreciating a high quality level). In some implementations, if there are more than a threshold number of users present in the environment, it may be impractical and unnecessary to attempt to individually analyze the engagement of each. Rather, an assumption may be made when this threshold number of potential viewers is reached (e.g., such as for a viewing party of a sporting event, etc.) that at least one user in the environment is always fully engaged and able to perceive and appreciate the high quality level, so engagement parameter 320 may be automatically set accordingly (i.e., so as to direct the highest quality level of content to be transmitted and to not reduce the quality as long as so many people are present).

Also shown within presentation environment 312 in FIG. 5 are various capture devices 314. Specifically, two video capture devices 314-1 (e.g., video cameras, etc.) and two audio capture devices 314-2 (e.g., microphones integrated with or separate from the video cameras, etc.) are depicted near screen 502. These capture devices 314 may be configured to monitor the behavior (e.g., position, movements, posture, facial expressions, etc.) of user 310, other users that may enter the environment (not shown in FIG. 5), and other real-time conditions within presentation environment 312. Based on the information captured by these capture devices 314, environment data 316 may be provided to engagement analysis 318 in any of the ways described herein. For example, environment data 316 may be provided to and processed by client device 308 or another computing device included within the client-side domain (see FIG. 3B) or may be transmitted to the server-side domain to be processed by system 100 or another suitable server-side computing system (see FIG. 3A). As both video and audio content may be captured by capture devices 314-1 and 314-2, the environment data 316 captured in the client domain may represent audio/video content portraying the real-time conditions of presentation environment 312, including real-time behavior of user 310.

While the capture devices 314 shown in FIG. 5 illustrate basic video capture (capture devices 314-1) and audio capture (capture devices 314-2) from devices mounted in the environment (e.g., security monitoring devices, etc.) for illustrative purposes, it will be understood that any suitable devices or sensors configured to capture any type of environment data described herein may implement capture devices 314 in certain implementations. For example, capture devices 314 may be implemented by webcams and/or microphones mounted on or near the display device where it can view users, other types of video or still cameras or microphones, heat detectors, motion detectors, and so forth. Such devices and sensors may be integrated into many types of appliances commonly found in homes and offices, including, for example, game consoles, computing devices, monitors, voice-activated concierge and artificial intelligence assistants, security systems, phones and household appliances, and so forth. By using these capture devices and, in some cases, their own computer vision and/or audio processing algorithms and sampling and processing methods, these devices enable detection of human presence, their distances to appliances, activity levels, poses, positions, and other states and conditions.

The environment data 316 captured and provided by capture devices 314 (capture devices such as illustrated in FIG. 5 and such as have been described) may be analyzed and used to determine whether users are in a position to appreciate and benefit from high quality levels of media content or whether they are likely to even notice if the quality level is temporarily reduced to a lower level or the like. As mentioned above in relation to engagement analysis 318, these determinations may be represented in one or more dynamic engagement parameters that are generated and updated in real time based on real-time environment data, historical environment data, and other information. Based on this data, real-time conditions of presentation environment 312 may be identified, including, for example, a position of user 310 with respect to screen 502 on which the media content is being presented within presentation environment 312, a posture of user 310 (e.g., whether the user is standing or seated, whether the user is looking at the screen or looking away, whether the user is in an attentive stance or a more relaxed or bored stance, etc.), facial expressions of user 310, audible speech being spoken by user 310, user input being provided by user 310 by way of a user input device, movement and other actions being performed by user 310, and/or other suitable real-time conditions as may serve a particular implementation.

To illustrate, FIG. 6 shows different illustrative positions 600-A and 600-B of user 310 with respect to screen 502 on which media content is being presented within presentation environment 312. More specifically, as shown, position 600-A of user 310 may be relatively close to screen 502, as indicated by a distance 602-A illustrated as a relatively short arrow between screen 502 and user 310. This position of user 310 may be associated with higher engagement with the media content. For example, by being located closer to screen 502, user 310 may be more likely to be paying attention to the media content and more able to appreciate subtle detail (e.g., a higher image resolution, a faster refresh rate, etc.) than if user 310 was further away from screen 502. Another aspect of position 600-A that may be accounted for is the fact that user 310 is centered in front of the screen (e.g., rather than off to the side, etc.). This condition may also be indicative of a high-attention state. In contrast, position 600-B of user 310 is shown to be considerably farther away from screen 502, as indicated by a distance 602-B illustrated as a relatively long arrow between screen 502 and user 310. This position of user 310 may be associated with lower engagement with the media content. For example, by being located farther from screen 502, user 310 may be less likely to be paying attention to the media content and less able to perceive subtle detail than when user 310 is at a closer distance such as distance 602-A.

To further illustrate how real-time conditions may reveal (or at least provide clues) as to how engaged user 310 is with media content being presented on screen 502, FIG. 7 shows different illustrative postures 700 (i.e., postures 700-A through 700-D) of user 310 within presentation environment 312 while the media content is being presented. The human body is capable of myriad different postures and poses, including the postures 700 illustrated in FIG. 7 and many others. Additionally, while not explicitly illustrated in FIG. 7, the human body is similarly capable of myriad different facial expressions that may be similarly indicative of attention and engagement like the body postures shown. To detect and analyze all of these possibilities, various pose analyzers, joint detectors, facial recognition algorithms, machine learning models, and other such tools may be utilized to determine (based on image data captured by capture devices 314) the postures and poses of users within the environment. As has been described, these postures and poses (including the positions illustrated in FIG. 6) and other conditions may be correlated (e.g., using machine learning models such as machine learning model 404) with levels of engagement and used to produce accurate and useful engagement parameters such as engagement parameter 320.

To illustrate a few examples of this type of real-time condition, posture 700-A shows user 310 in a standing posture (e.g., in the standing position in front of furniture 504, as illustrated in FIG. 5). User 310 may be turned toward screen 502 in this posture, which may indicate a higher level of engagement, but, at the same time, the fact that user 310 is standing (rather than comfortably seated) may indicate, at least for certain types of media content, that user 310 is less engaged than she would be if she was seated. If the presented media content is more interactive, on the other hand (e.g., an extended reality experience in which a user moves through a virtual scene), standing posture 700-A may be determined to indicate a higher level of engagement than a sitting posture would, though the casual hand that user 310 has in her pocket may conversely indicate that user 310 is less engaged in the virtual experience than she could be, and so forth. These and various other aspects may be analyzed and weighted by information incorporated into machine learning model 404 to estimate moment by moment how engaged user 310 is with the media content based on her posture.

As another example, posture 700-B shows user 310 to be relaxed and seated on the sofa (i.e., furniture 504). As mentioned above, the seated posture may be indicative of more interest in the media content under certain circumstances and/or for certain types of media content (e.g., comfortably watching a movie, etc.), while being indicative of less engagement under other circumstances and/or for other types of media content (e.g., an interactive video game or extended reality experience, etc.). Another condition that may be identified from posture 700-B is that user 310 appears to not be looking directly at screen 502 but to be looking elsewhere (e.g., somewhat off to the side as compared to posture 700-A). Depending on the layout of presentation environment, this may indicate that user 310 is slightly distracted (e.g., staring into space rather than watching screen 502 intently) or possibly giving her full attention to something other than the media content (e.g., a person located next to or in a room behind screen 502). Again, machine learning model 404 may learn over time how to effectively weight these potential correlations for the given environment and the particular user 310 so that intelligent and effective conclusions about the user's engagement may be consistently formed.

As yet another example, posture 700-C shows user 310 again seated on furniture 504 but in a posture that appears to indicate that she is engaged in conversation with another person in the room—a child labeled as user 702. User 702 is turned away from screen 502 toward user 310 while user 310 is facing user 702 in a manner that appears to indicate that they are engaged in a conversation. Speech captured by audio capture devices 314-2 may help further confirm that such a conversation is occurring if both user 310 and user 702 are detected to be conversing back and forth. In this posture, user 310 may be determined to have a relatively low level of engagement with the media content, since her attention is clearly at least partially directed at user 702. However, as user 310 is still largely facing screen 502 (such that it may be visible outside her area of focus), an engagement parameter 320 generated based on posture 700-C may indicate that certain aspects of the media content transmission quality are safe to temporarily downgrade (e.g., the frame rate, the audio fidelity, etc.), while others may be maintained (e.g., the image resolution, etc.).

In the final example of FIG. 7, posture 700-D shows user 310 seated on furniture 504 and leaning in toward screen 502 without any other apparent distractions. Moreover, user 310 is shown to be holding a user input device 704 (e.g., game controller) that she may be using to engage with the media content. In this example, the posture of user 310 may be indicative of a high level of engagement with the media content (e.g., a video game or other interactive content) and user input received by way of user input device 704 may further confirm this inference.

One or more dynamic engagement parameters 320 may be generated and updated based on any of the types of observations of postures 700 that have been described or other suitable observations that, over time, may be established by machine learning models to have associations with different levels of engagement of user 310. As the description above makes clear, there may not be any one condition or observation that is determinative of the engagement of a user. Rather, it is a holistic analysis of an aggregation of various real-time conditions, considered in light of historical patterns that have been observed and learned, that may ultimately allow system 100 to successfully determine how engaged the user is under given circumstances at a particular moment.

Figure 8:
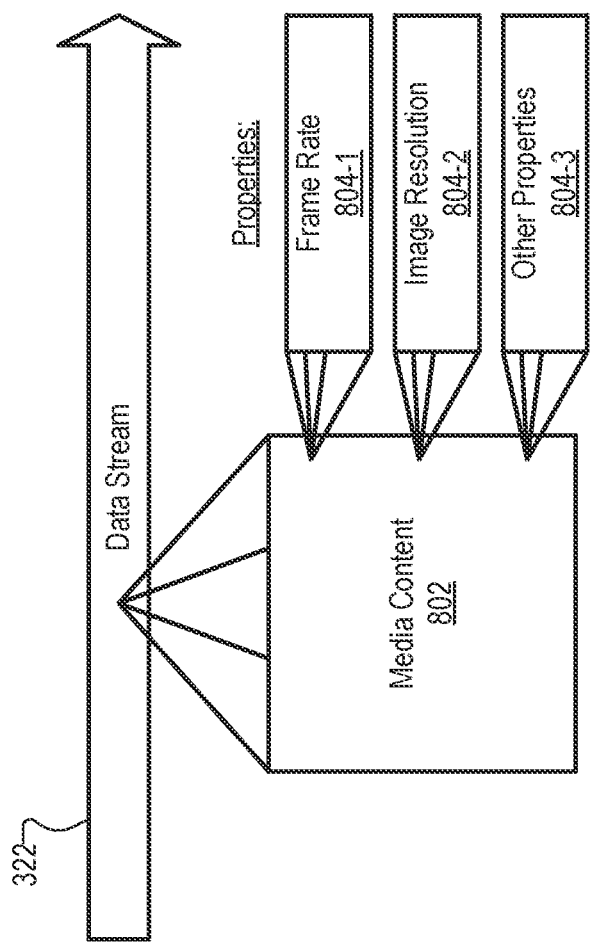
FIG. 8 shows illustrative aspects of a data stream representing media content characterized by a variety of properties that may be changed as part of managing a bandwidth used to transmit the data stream.

FIG. 8 shows illustrative aspects of data stream 322, which has been described above as being transmitted from system 100 to client device 308 and as representing media content at different quality levels based on the real-time engagement of the user with the media content (as encoded within engagement parameter 320). FIG. 8 illustrates that data stream 322 carries media content 802, which may be characterized by various properties 804 including a frame rate 804-1, an image resolution 804-2, and other properties 804-3. Each of these properties 804 may be independently adjusted in certain implementations to conserve and efficiently manage bandwidth usage by the data stream transmission. This may be done in accordance with principles described herein based on engagement parameters determined in any of the ways that have been described. Each of properties 804 will now be described in more detail.

A first way that system 100 may perform the adjusting of data stream 322 to represent media content 802 at a different quality level (e.g., the second quality level described above in relation to method 200) includes changing frame rate

804-1 of media content 802 (e.g., from 60 Hz to 30 Hz, etc.). Certain content providers and carriers may use Variable Refresh Rate (VRR) technology as a way of supporting bandwidth management, and frame rate 804-1 of media content 802 may be adjusted accordingly. VRR may be implemented using a dynamic display that can continuously and seamlessly change its refresh rate without user input. A display supporting a variable refresh rate may support a specific range of refresh rates (e.g., 30 Hz to 144 Hz), and frame rate 804-1 may continuously vary anywhere within this range. On displays with a fixed refresh rate, a frame may only be shown on the screen at specific intervals, evenly spaced apart. If a new frame is not ready when that interval arrives, then the old frame is held on screen until the next interval (thereby producing stutter) or a mixture of the old frame and the completed part of the new frame is shown (thereby producing screen tearing). Conversely, if the frame is ready before the interval arrives, then it will not be shown until that interval arrives. VRR technology may help to eliminate such stuttering and screen tearing by keeping refresh rates in sync with frame rate 804-1, which may be adjusted based on an engagement parameter determined in the ways described above. In this way, display motion may be kept smooth despite the varying frame rate, and power may be reduced by the temporary reduction of refresh rate (thereby helping to save battery power on battery-powered devices such as a laptop or mobile device).

Another way that system 100 may perform the adjusting of data stream 322 to represent media content 802 at a different quality level includes changing image resolution 804-2 of media content 802 (e.g., from 1080p to 720i, etc.). Similar to VRR technology, certain content providers and carriers support Dynamic Scalable Resolution (DSR) as another way of supporting bandwidth management, and image resolution 804-2 of media content 802 may be adjusted accordingly. DSR may be implemented as a shader/rendering setting that allows for individual render targets to be dynamically scaled to thereby reduce workload on the GPU or other processing resources. In cases where the frame rate of media content is reduced, the image resolution of the content may also or alternatively be gradually scaled down (e.g., to help maintain a consistent frame rate). Certain content production engines (e.g., modern video game engines, etc.) may trigger such resolution scaling when performance data suggests that the frame rate is about to decrease as a result of an application being GPU-bound. Manual scaling may also be imposed by preempting a particularly GPU-intensive section of the application and controlling the scaling via a script. If scaled gradually, dynamic image resolution can be almost unnoticeable.

As has been described, other properties of media content represented within a data stream may also be adjusted to affect the quality level of the media content and thereby manage the transmission bandwidth. For example, other properties 804-3 may include a video bitrate of media content 802, an audio bitrate of media content 802, a brightness at which media content 802 is presented, a color encoding for media content 802, the objects represented within media content 802 that are being actively updated (e.g., in an implementation involving extended reality content that includes a variety of objects that may or may not all be viewable at once by the user), and so forth.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EE-PROM, any other memory chip or cartridge, or any other tangible medium from which a computer can read.

Figure 9:
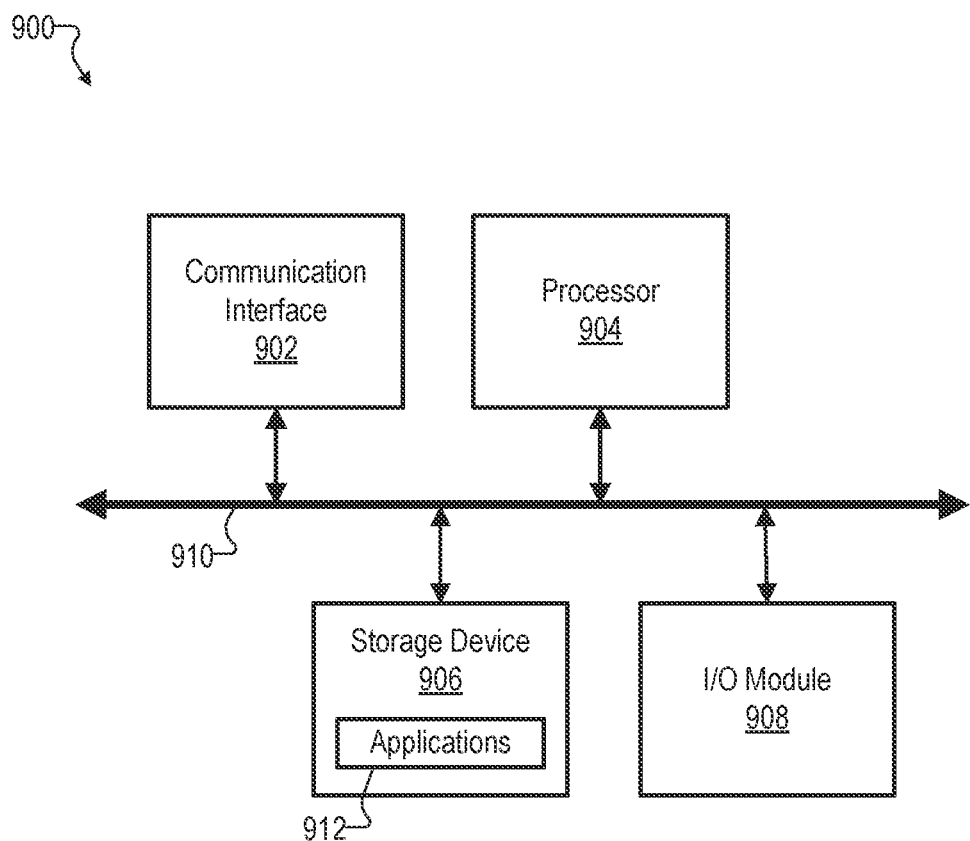
FIG. 9 shows an illustrative computing device that may implement content server systems and/or other computing systems described herein.

FIG. 9 shows an illustrative computing device 900 that may implement content server systems and/or other computing systems described herein. For example, computing device 900 may include or implement (or partially implement) a content server system such as system 100, a client device such as client device 308, one or more capture devices such as capture devices 314, a presentation device such as represented by screen 502, other computing devices described herein such as those that may assist with engagement analysis 318, certain elements of a network such as network 304, and/or any other computing devices or systems described herein (or any elements or subsystems thereof).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   transmitting, by a content server system associated with a server domain to a client device associated with a client domain, a data stream representing media content at a first quality level for presentation within a presentation environment as the data stream is transmitted;
   determining, by the content server system based on environment data captured in the client domain to represent real-time conditions of the presentation environment as the media content is presented, an engagement parameter representing a real-time engagement level of a user with respect to the media content, wherein:
   the environment data representative of the real-time conditions used to determine the engagement parameter includes a layout of the presentation environment indicative of at least one of a location or an orientation of seating with respect to a presentation device; and
   the determining of the engagement parameter includes:
   managing, based on the environment data, a machine learning model configured to identify a correlation between the real-time conditions represented by the environment data and a quality level for the media content that is likely to be discerned by the user, the machine learning model trained based on the layout of the presentation environment indicative of the at least one of the location or the orientation of seating with respect to a presentation device; and
   generating the engagement parameter based on the environment data and using the machine learning model; and
   adjusting, by the content server system based on the engagement parameter and in real time as the transmitting of the data stream is performed and the media content is presented, the data stream to represent the media content at a second quality level that is different from the first quality level.

2. The method of claim 1, wherein the environment data captured in the client domain represents audio/video content portraying the real-time conditions of the presentation environment including real-time behavior of the user.

3. The method of claim 1, wherein the real-time conditions of the presentation environment further include a position of the user with respect to a screen on which the media content is being presented within the presentation environment.

4. The method of claim 1, wherein the real-time conditions of the presentation environment further include a posture of the user.

5. The method of claim 1, wherein the real-time conditions of the presentation environment further include audible speech spoken by the user.

6. The method of claim 1, wherein the real-time conditions of the presentation environment further include user input being provided by the user by way of a user input device.

7. The method of claim 1, wherein the adjusting of the data stream to represent the media content at the second quality level includes changing a frame rate of the media content.

8. The method of claim 1, wherein the adjusting of the data stream to represent the media content at the second quality level includes changing an image resolution of the media content.

9. The method of claim 1, wherein the determining of the engagement parameter includes:
   receiving the environment data from a capture device operating in the client domain and configured to capture and provide the environment data; and generating the engagement parameter based on a server-side analysis the received environment data.

10. The method of claim 1, wherein the determining of the engagement parameter includes receiving the engagement parameter from a device that operates in the client domain and is configured to generate and provide the engagement parameter based on a client-side analysis of the environment data.

11. The method of claim 1, wherein:
the first quality level is a default quality level;
the engagement parameter on which the adjusting of the data stream is based indicates that the user is detected to be engaging with the media content being presented; and
the second quality level at which the media content is presented subsequent to the adjusting of the data stream is higher than the default quality level.

12. A system comprising:
a memory storing instructions; and
one or more processors communicatively coupled to the memory and configured to execute the instructions to perform a process comprising:
transmitting, to a client device associated with a client domain, a data stream representing media content at a first quality level for presentation within a presentation environment as the data stream is transmitted;
determining, based on environment data captured in the client domain to represent real-time conditions of the presentation environment as the media content is presented, an engagement parameter representing a real-time engagement level of a user with respect to the media content, wherein:
the environment data representative of the real-time conditions used to determine the engagement parameter includes a layout of the presentation environment indicative of at least one of a location or an orientation of seating with respect to a presentation device; and
the determining of the engagement parameter includes:
managing, based on the environment data, a machine learning model configured to identify a correlation between the real-time conditions represented by the environment data and a quality level for the media content that is likely to be discerned by the user, the machine learning model trained based on the layout of the presentation environment indicative of the at least one of the location or the orientation of seating with respect to a presentation device; and
generating the engagement parameter based on the environment data and using the machine learning model; and
adjusting, based on the engagement parameter and in real time as the transmitting of the data stream is performed and the media content is presented, the data stream to represent the media content at a second quality level that is different from the first quality level.

13. The system of claim 12, wherein the environment data captured in the client domain represents audio/video content portraying the real-time conditions of the presentation environment including real-time behavior of the user.

14. The system of claim 12, wherein the real-time conditions of the presentation environment further include a position of the user with respect to a screen on which the media content is being presented within the presentation environment.

15. The system of claim 12, wherein the real-time conditions of the presentation environment further include a posture of the user.

16. The system of claim 12, wherein the adjusting of the data stream to represent the media content at the second quality level includes changing a frame rate of the media content.

17. The system of claim 12, wherein the adjusting of the data stream to represent the media content at the second quality level includes changing an image resolution of the media content.

18. A non-transitory computer-readable medium storing instructions that, when executed, direct a processor of a computing device to perform a process comprising:
transmitting, to a client device associated with a client domain, a data stream representing media content at a first quality level for presentation within a presentation environment as the data stream is transmitted;
determining, based on environment data captured in the client domain to represent real-time conditions of the presentation environment as the media content is presented, an engagement parameter representing a real-time engagement level of a user with respect to the media content, wherein:
the environment data representative of the real-time conditions used to determine the engagement parameter includes a layout of the presentation environment indicative of at least one of a location or an orientation of seating with respect to a presentation device; and
the determining of the engagement parameter includes:
managing, based on the environment data, a machine learning model configured to identify a correlation between the real-time conditions represented by the environment data and a quality level for the media content that is likely to be discerned by the user, the machine learning model trained based on the layout of the presentation environment indicative of the at least one of the location or the orientation of seating with respect to a presentation device; and
generating the engagement parameter based on the environment data and using the machine learning model; and
adjusting, based on the engagement parameter and in real time as the transmitting of the data stream is performed and the media content is presented, the data stream to represent the media content at a second quality level that is different from the first quality level.

19. The method of claim 1, wherein the adjusting of the data stream to represent the media content at the second quality level includes:
changing a frame rate of the media content from a first frame rate to a second frame rate; and
syncing the second frame rate to a refresh rate of a display device displaying the media content.

* * * * *